No. 746,507. PATENTED DEC. 8, 1903.
J. F. HENNER.
FEEDER FOR THRESHING MACHINES.
APPLICATION FILED MAR. 21, 1903.
NO MODEL. 2 SHEETS—SHEET 1.
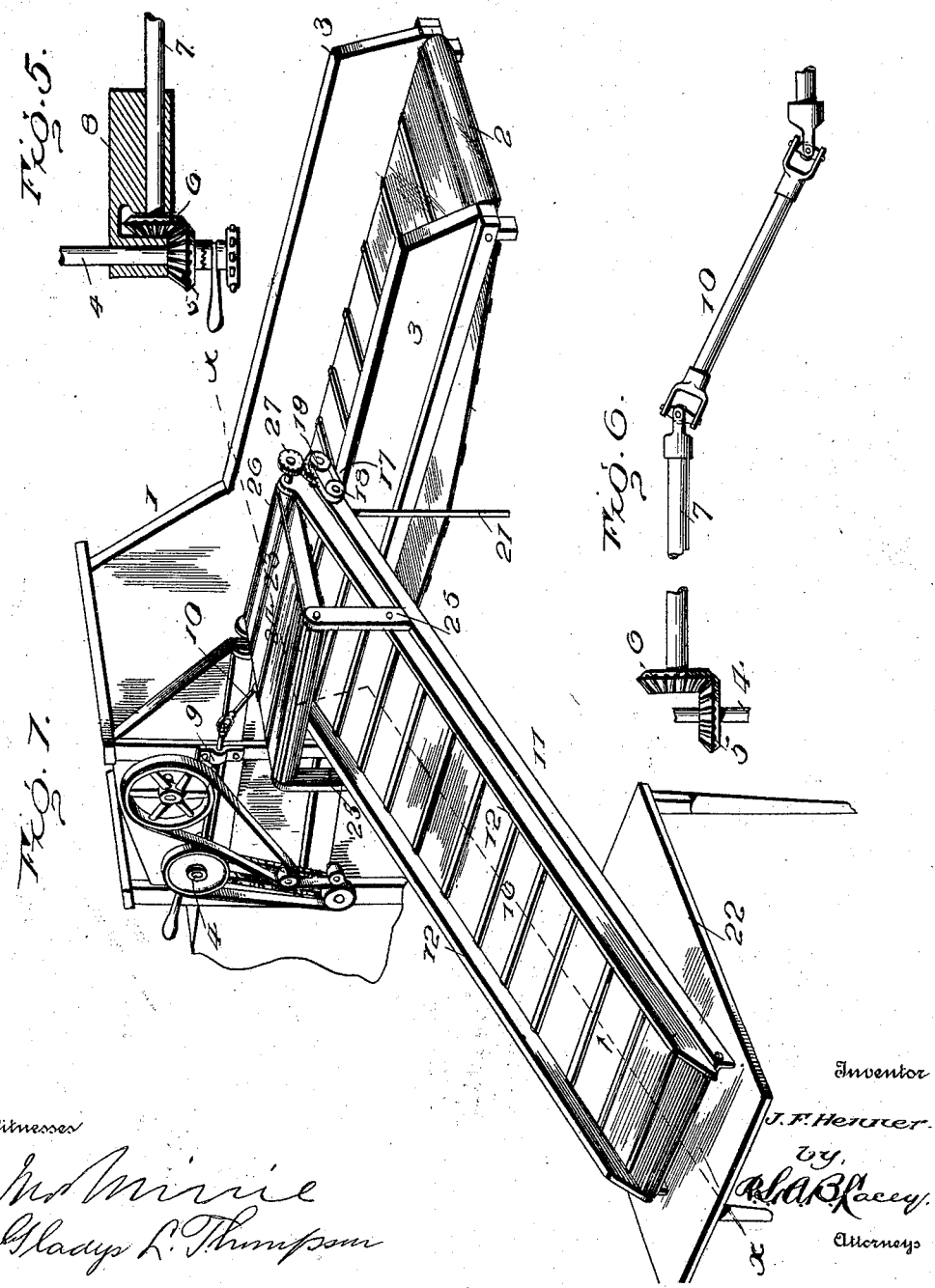

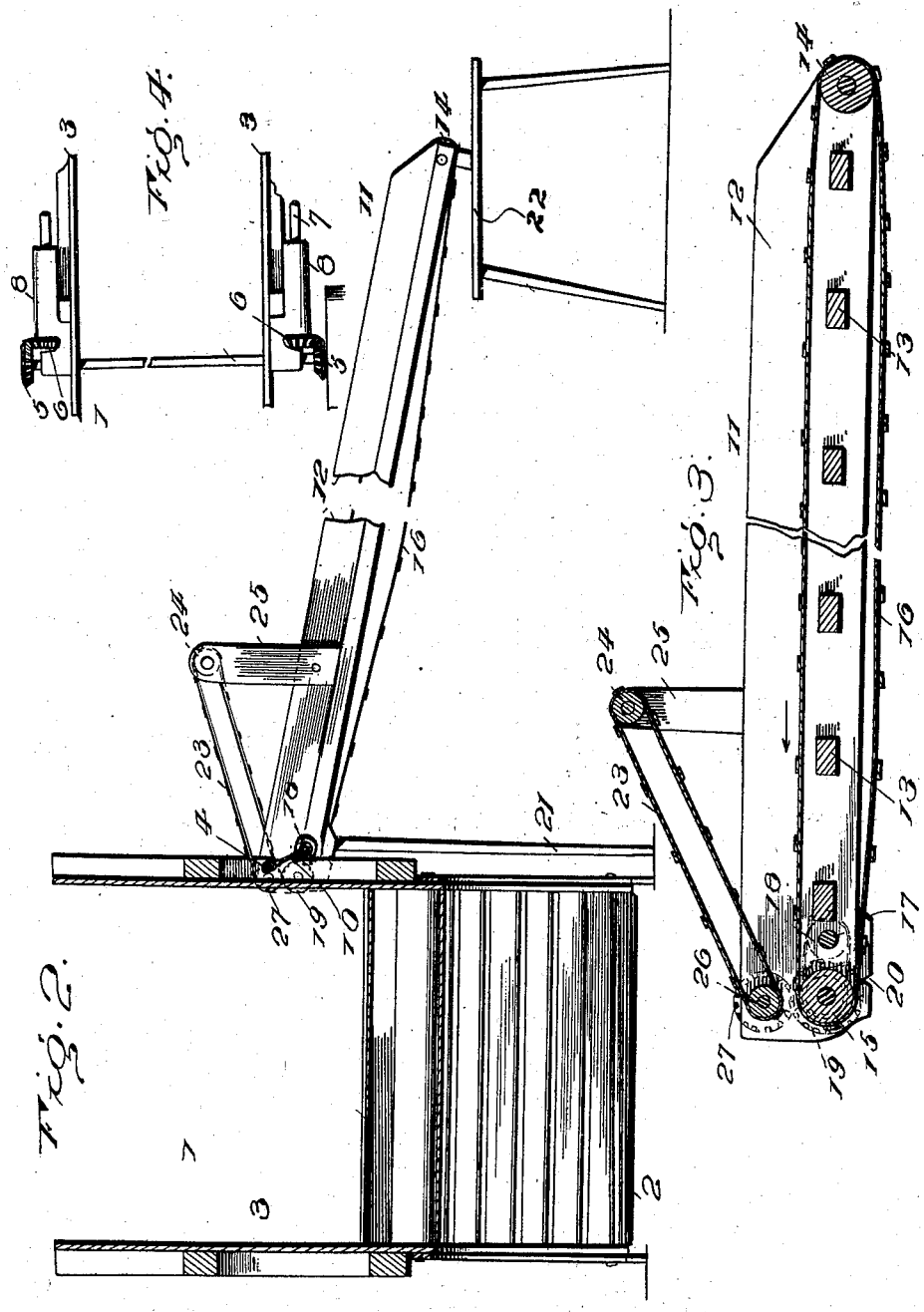

No. 746,507. Patented December 8, 1903.

UNITED STATES PATENT OFFICE.

JOSEPH F. HENNER, OF HAINES, OREGON.

FEEDER FOR THRESHING-MACHINES.

SPECIFICATION forming part of Letters Patent No. 746,507, dated December 8, 1903.

Application filed March 21, 1903. Serial No. 148,969. (No model.)

*To all whom it may concern:*

Be it known that I, JOSEPH F. HENNER, a citizen of the United States, residing at Haines, in the county of Baker and State of Oregon, have invented certain new and useful Improvements in Feeders for Threshing-Machines, of which the following is a specification.

This invention has relation to the class of milling machinery, and particularly to the apparatus for automatically feeding grain to threshing machinery.

Band-cutters and feeders so designated in the art are not as a general rule constructed with a view to feed loose grain to the thresher, same being supplied thereto in bundles or gavels, which are carried forward in a straight path.

This invention is devised to enable bundles or loose grain being fed with equal facility to the thresher, the invention consisting, primarily, of a lateral feeder adapted to be applied to either side of the usual feeder and extending twenty feet, more or less, therefrom, so as to pass by one or more stacks of grain, whereby the same may be thrown upon the feeder and carried to and delivered upon the primary feeder.

The invention deals more particularly with the instrumentalities whereby the lateral feeder is operated and adapted to be applied to either side of the primary feeder.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a feeder for threshing-machines, showing the application of the invention. Fig. 2 is a transverse section on the line X X of Fig. 1 on a larger scale. Fig. 3 is a longitudinal section of the supplemental or side feeder. Fig. 4 is a detail view showing the manner of gearing the side shafts of the primary feeder to the drive-shaft thereof. Fig. 5 is a detail view on a larger scale, showing the means for supporting and connecting a side shaft with the drive-shaft. Fig. 6 is a detail view of the means for driving the side or supplemental feeder from the primary feeder.

Corresponding and like parts are referred to in the following description and indicated in all the views of the drawings by the same reference characters.

The band-cutter and feeder (illustrated at 1) may be of any ordinary type or pattern, such as commonly employed for feeding bundles of grain to the threshing mechanism, the band of the bundles being cut and the grain spread preliminary to delivery of the grain to the threshing mechanism. The carrier 2 is of the endless type and is protected at its sides by boards 3, which prevent lateral displacement of the grain. The shaft of the main or primary feeder 1, from which the power is taken for operating the side or supplemental feeder, is designated as the drive-shaft and is indicated at 4 and is provided near its ends with bevel-gears 5 in meshing relation with corresponding bevel-gears 6 at the forward ends of longitudinal shafts 7 at the sides of the feeder 1. The shafts 4 and 7 are mounted in bearings 8, having transverse and longitudinal openings for their reception. The rear ends of the side shaft 7 are journaled in bearings 9, secured to the sides of the feeder, and are adapted to be connected to the drive-shaft of the side feeder by means of a tumbling rod 10 in any convenient way.

The side feeder is indicated at 11 and is similar in construction to the part 2 of the main feeder and comprises side pieces 12 and connecting cross-bars 13. A roller 14 is provided at one end of the frame and a corresponding roller 15 at the opposite end, and these rollers support the endless apron or carrier 16, which may be of any structural type. The roller 15 is positively driven and serves to operate the carrier or belt 16. A shaft 17 is arranged parallel with the axis of the roller 15 and is adapted to be coupled to the tumbling rod 10 and is provided with a gear-wheel 18, connected by belt with a gear-wheel 19, secured to a journal or shaft of roller 15. The side pieces of the frame of feeder 11 have pendent portions at or near the end to be applied to feeder 1, and said portions are notched, as shown at 20, to engage over the upper edge of a side piece 3 and hold feeder 11 in place when applied thereto. As is well known, feeder 1 inclines longitudinally and feeder 11 has its transverse elements horizontal. Hence the side of feeder 11 facing the receiving end of feeder 1 is in a higher plane and is supported by means of a prop 21, consisting of a pole or stake. The outer end of feeder 11 rests upon a platform 22, and by reason of the great length of the feeder its inclination is gradual, and said platform 22 is adapted to be low down. Feeder 11 is adapted to be applied to either side of feeder 1, according to the convenience of the operator, and also enabling feeder 1 to be centrally located with reference to a group of stacks, so that after the grain upon one side of feeder 1 has been exhausted feeder 11 may be changed to the opposite side for feeding the grain therefrom.

To prevent any wind blowing the loose grain from the delivery end of feeder 11 and also to slightly compress said grain, an endless apron 23 is provided and located above the delivery portion of the carrier 16 and inclines upwardly and rearwardly from roller 15. The endless apron 23 is supported at its rear end upon roller 24, journaled in standards 25, rising from the frame of feeder 11, and is supported at its front end by means of roller 26, journaled to the sides 12 of feeder 11 adjacent to roller 15 and geared thereto by means of gear-wheel 27, secured to an end thereof and meshing with a companion gear-wheel secured to the end of shaft or journal of roller 15.

The supplemental feeder 11 extends from feeder 1 approximately at a right angle and may be of any determinate length and delivers the loose grain over the sides of feeder 1 on to carrier 2, which delivers the same to the threshing mechanism in the usual manner. The adjacent portions of apron 23 and carrier 16 travel in the same direction—that is, toward feeder 1—so as to deliver the grain thereto.

Having thus described the invention, what is claimed as new is—

In a band-cutter and feeder, and in combination with the longitudinally-inclined main feeder, a drive-shaft, longitudinal shafts at the sides of the main feeder and geared to said drive-shaft, bearings secured to the sides of the main feeder and provided with transverse and longitudinal openings for receiving, respectively, the said drive and longitudinal shafts, a supplemental feeder adapted to be applied to either side of the main feeder, notched portions at the inner end of the supplemental feeder to engage over a side of the main feeder, an endless apron inclined to the carrier of the supplemental feeder, gearing between the apron and carrier of the supplemental feeder, a prop for supporting the inner end of the supplemental feeder at the side remote from the threshing mechanism, a platform for supporting the outer end of the supplemental feeder, and means for connecting either one of the aforesaid longitudinal shafts with either end of the drive-shaft of the supplemental feeder according to the position of the latter, substantially as set forth.

In testimony whereof I affix my signature in presence of two witnesses.

JOSEPH F. HENNER. [L. S.]

Witnesses:
J. F. O'BRYANT,
LEE G. DUNCAN.